US008717278B2

(12) United States Patent
Atkins et al.

(10) Patent No.: US 8,717,278 B2
(45) Date of Patent: May 6, 2014

(54) METHOD AND APPARATUS FOR ADJUSTING DRIVE VALUES FOR DUAL MODULATION DISPLAYS

(75) Inventors: Robin Atkins, Campbell, CA (US); Neil W. Messmer, Langley (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/817,232

(22) PCT Filed: Aug. 16, 2011

(86) PCT No.: PCT/US2011/047947

§ 371 (c)(1), (2), (4) Date: Feb. 15, 2013

(87) PCT Pub. No.: WO2012/030526

PCT Pub. Date: Mar. 8, 2012

(65) Prior Publication Data

US 2013/0147862 A1 Jun. 13, 2013

Related U.S. Application Data

(60) Provisional application No. 61/378,779, filed on Aug. 31, 2010.

(51) Int. Cl.

| | |
|---|---|
| ***G09G 3/36*** | (2006.01) |
| ***G06F 3/038*** | (2013.01) |
| ***G09G 5/00*** | (2006.01) |
| ***G09G 5/10*** | (2006.01) |

(52) U.S. Cl.

USPC ............................ 345/102; 345/204; 345/690

(58) Field of Classification Search

USPC .................................... 345/87–104, 204–699

See application file for complete search history.

(56) References Cited

U.S. PATENT DOCUMENTS

| | | | | |
|---|---|---|---|---|
| 7,176,878 | B2 | 2/2007 | Lew | |
| 8,217,970 | B2 | 7/2012 | Whitehead | |
| 2004/0113906 | A1 * | 6/2004 | Lew et al. | 345/211 |

(Continued)

FOREIGN PATENT DOCUMENTS

| | | |
|---|---|---|
| WO | 02/069030 | 9/2002 |
| WO | 03/077013 | 9/2003 |

(Continued)

OTHER PUBLICATIONS

Notification of Transmittal of the International Search Report and the Written Opinion of the International Searching Authority, or the Declaration issued in PCT/US2011/047941 on Nov. 9, 2011, 13 pages.

*Primary Examiner* — Sumati Lefkowitz
*Assistant Examiner* — David Tung
(74) *Attorney, Agent, or Firm* — Fish & Richardson P.C.

(57) ABSTRACT

Method and apparatus are provided for determining and adjusting drive values for a display comprising a light source modulation layer such as a backlight array of LED and a display modulation layer such as an LCD panel. Image regions for which any of the display modulation layer drive values are above a predetermined threshold maximum value or below a predetermined threshold minimum value are flagged. The light source modulation layer control values determined for a subsequent frame of image data may be adjusted based on the flagged image regions. The adjustments to the light source modulation layer control values may reduce artifacts in the displayed image and increase the efficiency of the display.

13 Claims, 7 Drawing Sheets

(56) References Cited

U.S. PATENT DOCUMENTS

| | | | | |
|---|---|---|---|---|
| 2006/0125771 | A1 | 6/2006 | Inuzuka | |
| 2007/0296689 | A1 | 12/2007 | Kimura | |
| 2008/0129677 | A1 | 6/2008 | Li | |
| 2009/0002402 | A1 | 1/2009 | Barnhoefer | |
| 2009/0091524 | A1 | 4/2009 | Lomas | |
| 2009/0109170 | A1 | 4/2009 | Kwon | |
| 2009/0167789 | A1 | 7/2009 | Kerofsky | |
| 2009/0267926 | A1 | 10/2009 | Seo | |
| 2009/0295705 | A1 | 12/2009 | Chen | |
| 2009/0303207 | A1 | 12/2009 | Ng | |
| 2010/0020003 | A1* | 1/2010 | Feng | 345/102 |
| 2010/0020005 | A1 | 1/2010 | Jung | |
| 2010/0085374 | A1 | 4/2010 | Lee | |
| 2011/0175949 | A1 | 7/2011 | Wallener | |
| 2012/0306943 | A1 | 12/2012 | Messmer | |

FOREIGN PATENT DOCUMENTS

| | | |
|---|---|---|
| WO | 2005/093703 | 10/2005 |
| WO | 2006/010244 | 2/2006 |
| WO | 2008/092276 | 8/2008 |
| WO | 2010/024009 | 3/2010 |

* cited by examiner

METHOD AND APPARATUS FOR ADJUSTING DRIVE VALUES FOR DUAL MODULATION DISPLAYS

CROSS-REFERENCE TO RELATED APPLICATIONS

This application claims priority to U.S. Provisional Patent Application No. 61/378,779 filed 31 Aug. 2010, hereby incorporated by reference in its entirety.

TECHNICAL FIELD

This invention relates to dual modulation displays. Particular embodiments relate to methods and apparatus for generating and adjusting drive values for dual modulation displays.

BACKGROUND

Dual modulation displays, such as may be used in high brightness and/or high-dynamic range (HDR) displays, for example, may incorporate a spatially modulated light source such as those described in PCT Patent Application Publication Nos. WO02/069030, WO03/077013, WO2006/010244 and WO2008/092276. Such displays comprise a light source modulation layer (e.g. a spatially modulated backlight) and a display modulation layer. The light source modulation layer may be driven to produce a comparatively low-resolution representation of an image which is subsequently provided to the display modulation layer. The low-resolution representation is further modulated by the display modulation layer to provide a higher resolution image which is viewed by the observer. The light source modulation layer may comprise a matrix of actively modulated light sources, such as light-emitting diodes (LEDs), for example. The display modulation layer, which may be positioned and/or aligned to receive light from the light source modulation layer, may comprise a liquid crystal display (LCD), for example. The brightness of a pixel on the display modulation layer is therefore affected by the variable localized brightness across the light source modulation layer.

Some artifacts may be apparent in an image displayed on a dual modulation display if the light source modulation layer provides too much light or insufficient light to areas of the display modulation layer which cannot be entirely compensated for by driving the pixels on the display modulation layer to minimum or maximum light transmissivity states. For example:

- If the light source modulation layer provides too much light to a certain area of the display modulation layer, the affected area of the display modulation layer may appear to be clipped to a certain minimum local brightness level, even if the pixels in the affected area are driven to a state of minimum transmissivity (i.e. a fully "closed" position). This may result in a loss of detail in the affected area, raised black levels, and color shifts.
- If the light source modulation layer does not provide enough light to a certain area of the display modulation layer, the affected area of the display modulation layer may appear to be clipped to a certain local maximum brightness level, even if the pixels in the affected area are driven to a state of maximum transmissivity (i.e. a fully "open" position). This may result in a loss of appearance of texture in the affected area, decreased white levels, and color shifts.

There is a desire for methods and apparatus for driving dual modulation displays to reduce the appearance of these artifacts.

For efficiency purposes it is desirable to drive the light source modulation layer to provide the minimum amount of light to the display modulation layer to achieve the desired image brightness. Dual modulation displays may be running at less than optimal efficiency if the pixels of the display modulation layer are driven to lower transmissivity states (e.g. near or in a "closed" position) in order to compensate for overly bright regions of the light source modulation layer. There is a desire for methods and apparatus for driving dual modulation displays in a more efficient manner.

SUMMARY

This invention has a number of different aspects. These include, without limitation: dual modulation displays having a light source modulation layer and a display modulation layer; methods and apparatus for converting image data (such, as for example, video data or still image data) into drive values for displaying the image data on a dual modulation display; methods and apparatus for determining or generating drive values for controlling dual modulation displays; methods and apparatus for improving or optimizing light source modulation layer drive values; methods and apparatus for adjusting light source modulation layer drive values for successive frames of image data taking into account regions of the display which had too little or too much light to display the desired image in previous frames; and the like.

One aspect provides a method for generating drive values for a display. The display comprises a light source modulation layer and a display modulation layer. The method comprises receiving a frame of image data; determining a first set of light source modulation layer drive values based at least in part on the frame of image data; determining an expected luminance profile at the display modulation layer, based at least in part on the first set of light source modulation layer drive values; determining display modulation layer drive values, based at least in part on the expected luminance profile; comparing the display modulation layer drive values to a predetermined threshold maximum value and a predetermined threshold minimum value; flagging image regions for which any of the display modulation layer drive values are above the predetermined threshold maximum value or below the predetermined threshold minimum value; and based on the flagged image regions, adjusting a second set of light source modulation layer drive values determined for a subsequent frame of image data. Another aspect provides a method for adjusting light source modulation layer drive values for driving a display to display a current frame of image data. The method comprises receiving a set of display modulation layer drive values determined for a previous frame of image data; scanning the set of display modulation layer drive values for values that are above a predetermined threshold maximum value and below a predetermined threshold minimum value; flagging image regions for which any of the display modulation layer drive values are above the predetermined threshold maximum value or below the predetermined threshold minimum value; and based on the flagged image regions, adjusting the light source modulation layer drive values.

Another aspect provides a display comprising a light source modulation layer and a display modulation layer. The display is operable to display image data. A processor is operable to provide control signals to the display based on the image data. The processor is configured to: determine light source modulation layer drive values based at least in part on the image data; determine an expected luminance profile at the display modulation layer, based at least in part on the light source modulation layer drive values; determine display modulation layer drive values, based at least in part on the expected luminance profile; scan the display modulation layer drive values for values that are above a predetermined threshold maximum value and below a predetermined threshold minimum value; flag image regions for which any of the display modulation layer drive values are above the predetermined threshold maximum value or below the predetermined threshold minimum value; and based on the flagged image regions for a previous frame of image data, adjust the light source modulation layer drive values.

Further aspects of the invention and features of specific embodiments of the invention are described below.

BRIEF DESCRIPTION OF DRAWINGS

The accompanying drawings illustrate non-limiting embodiments of the invention.

DESCRIPTION

Figure 1A:
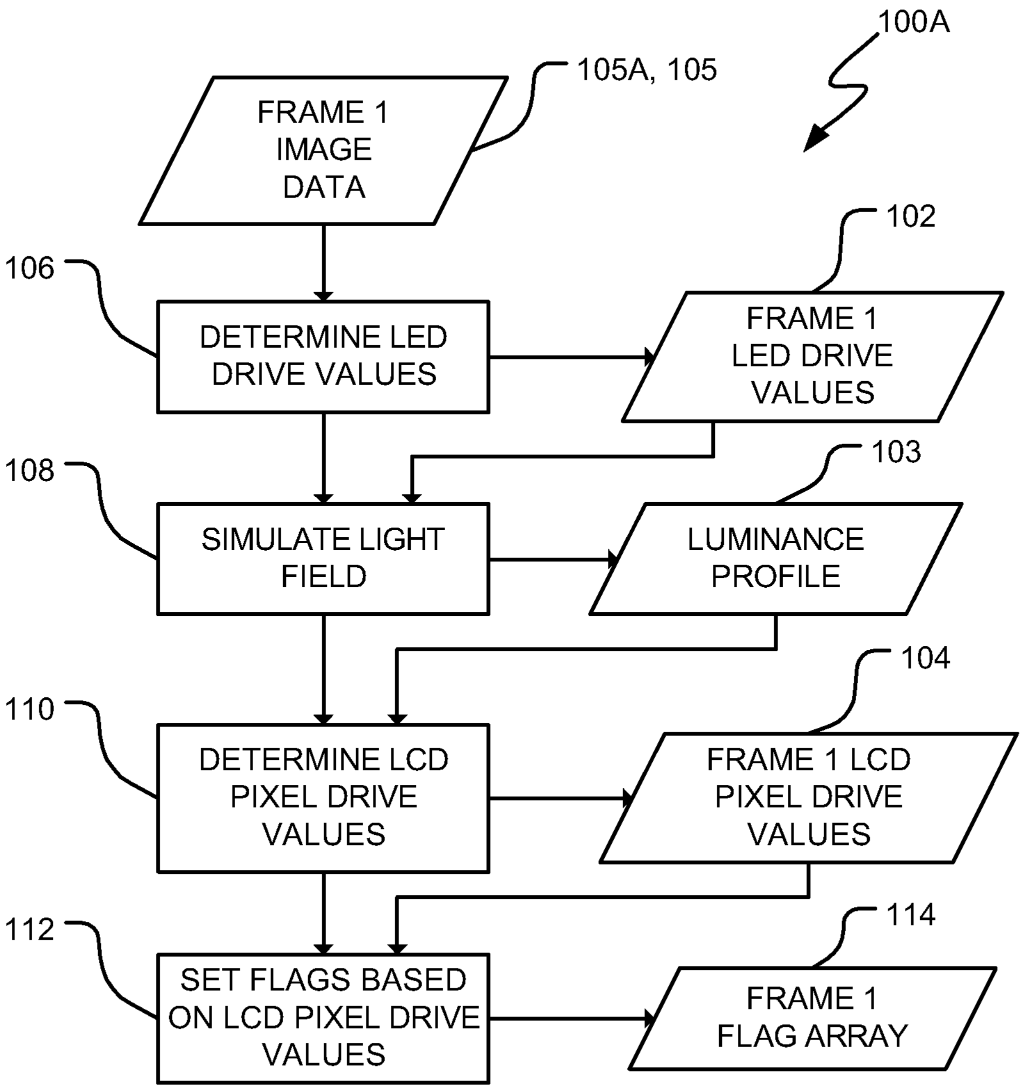
FIG. 1A is a flow chart illustrating a method for generating drive values for a first frame of image data according to an example embodiment.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Embodiments provide for methods and apparatus for adjusting light source modulation layer drive values based at least in part on display modulation layer drive values determined for a previous frame of image data. In particular embodiments, the light source modulation layer comprises a backlight comprising a matrix of LEDs, and the display modulation layer comprises a LCD panel comprising an array of LCD pixels. LED drive values and LCD pixel drive values may be provided to the backlight and LCD panel, respectively, to operate the display.

In a first iteration of a method according to a particular embodiment, backlight LED drive values for a first frame of image data are derived from the image data. Based on such LED drive values, an expected luminance profile is calculated for light received at the LCD panel from the backlight. LCD pixel drive values are then determined based on the expected luminance profile. Example methods that may be applied for determining LED drive values and LCD pixel drive values to display images are described in US Patent Publication No. 2008/0180466 filed 26 Jan. 2007 and entitled RAPID IMAGE RENDERING ON DUAL-MODULATOR DISPLAYS which is hereby incorporated herein by reference. In subsequent iterations of the method performed for the same and/or successive frames of image data, the LED drive values may be adjusted based on whether the LED drive values result in some areas receiving too much or too little light. In some embodiments, such adjustment is based on LCD pixel drive values. For example, adjustments may be performed in cases where, in a previous frame of image data, the LCD pixel drive values are above a threshold maximum value and/or below a threshold minimum value.

Each frame of image data may be divided into regions, and the methods described herein may be performed on each region. In some embodiments, for each region on which the methods are performed, LCD pixel drive values may be compared to predetermined threshold values.

For example, in particular embodiments, if the LCD pixel drive values for an image region of one frame of image data are above a threshold maximum value (e.g. the threshold maximum value may be set to correspond to when the LCD pixels would be driven to a high transmissivity state, or a fully "open" position), then for a subsequent frame of image data (or, in certain embodiments, for the same frame of image data in a subsequent iteration of the method) the LED drive values corresponding to the image region may be adjusted by raising the LED drive values by a predetermined or computed amount. Conversely, if the LCD pixel drive values for an image region of one frame of image data are below a threshold minimum value (e.g. the threshold minimum value may be set to correspond to when the LCD pixels would be driven to a low transmissivity state, or a fully "closed" position), then for a subsequent frame of image data (or, in certain embodiments, for the same frame of image data in a subsequent iteration of the method) the LED drive values corresponding to the image region may be adjusted by lowering the LED drive values by a predetermined or computed amount.

The adjustments to the LED drive values performed according to the methods described herein may provide for improved backlight control. When the adjusted LED drive values are applied to drive the backlight, there may be a decrease in artifacts in the displayed image caused by the clipping of LCD pixels to minimum or maximum levels of brightness. Moreover, as a result of the LED drive value adjustments, the LED drive values may be lowered to compensate for overly bright regions, rather than lowering the transmissivity of the LCD pixels to perform the same function. As such, the efficiency of the display may be increased (i.e. by reducing the backlight power consumption).

Particular embodiments described herein may be useful for display of still images or video having slowly or smoothly varying or moving content. For such image data, the adjustments to LED drive values made in successive frames of image data (and, in some embodiments, over successive iterations of the method on the same frame of image data) may generate LED drive values which approach optimal LED drive values (e.g. leading to reduced artifacts in image display, and facilitating more efficient display operation). As described below, the methods may be adapted for application to more rapidly changing image data.

FIG. 1A illustrates an example method 100A for generating backlight drive values (e.g. LED drive values 102 in the illustrated embodiment) and display modulation layer drive values (e.g. LCD pixel drive values 104 in the illustrated embodiment) for a first frame 105A of image data 105. First frame 105A may be an initial frame of image data in a series of frames. Method 100A begins at block 106 by determining the light source or LED drive values 102 based on the first frame 105A of image data 105. Suitable techniques may be used for the block 106 determination of light source drive values. Such techniques may involve, for example, determining each light source drive value based on a weighted combination of maximum pixel value and average pixel value for a local region of the image corresponding to the light source. In other embodiments the light source drive value determination may involve nearest neighbor interpolation, or the like, and may be based on factors such as intensity or color of image data 105.

At block 108, a light field simulation is performed to determine an expected luminance profile 103 of light received at the display modulation layer. The block 108 light field simulation may be based at least in part on the light source drive values 102 determined at block 106. By way of non-limiting examples, methods for determining expected luminance received at the display modulation layer are described in PCT Publication Nos. WO03/077013, WO2006/010244 and WO2008/092276, which are hereby incorporated herein by reference. In particular embodiments, the light field simulation may be carried out by performing a two-dimensional convolution of each of the light source locations, weighted by the intensity of the light sources (e.g. as determined by the light source drive values 102 determined at block 106), with predetermined filter coefficients corresponding to the pattern of light generated by each light source.

The LCD pixel drive values 104 are then determined at block 110. Appropriate drive values 104 may be determined to control the transmissivity of the LCD pixels so that the brightness of the pixels approaches target or desired brightness levels. The block 110 determination may take into account the spatially varying light pattern received on the display modulation layer and the target brightness levels specified in the image data. For example, the block 110 determination may involve dividing the target image brightness by the light field determined at block 108 (or equivalently multiplying the target image brightness by the inverse of the light field determined at block 108).

At block 112, LCD pixel drive values 104 are evaluated for regions of frame 105A to determine whether to flag the image region for adjustment of LED drive values 102 in one or more subsequent frames of image data. In particular embodiments, the flag for each region may be initialized to “1” to signify no adjustment. If drive values 104 for an image region are above a certain threshold maximum value (e.g. the LCD pixels are driven to a high transmissive state), then the flag for the image region may be set to some amount above 1. If drive values 104 for an image region are below a certain threshold minimum value (e.g. the LCD pixels are driven to a low transmissive state), then the flag for the image region may be set to some amount below 1.

In certain embodiments, the LCD pixel drive values are constrained to values between “0” and “1” (wherein “1” corresponds to a completely “open” position and “0” corresponds to a completely “closed” position). If the block 110 determination resulted in any LCD pixel drive values that are greater than 1 for a certain region, then such region may be flagged at block 112 for additional processing in subsequent frames. If the block 110 determination resulted in any LCD pixel drive values that are 0 for a certain region, then the image displayed may have raised black levels (particularly if the region’s corresponding backlight driving level is greater than zero—i.e. the local backlight element(s) are “on”). Such region may therefore be flagged at block 112 for additional processing in subsequent frames.

The result of the block 112 determination may be an array 114 of flags for the frame of image data. Flag array 114 may correspond to an array of light source modulation layer elements. In particular embodiments, each flag in flag array 114 may correspond to one light source modulation layer element. The flags are indicative of regions where the backlight may be providing too much light or too little light to display the desired image (or in some embodiments more light than necessary or less light than desired). Flag array 114 may be used to generate adjusted LED drive values 102 for subsequent frames of image data, as explained below with reference to method 100B. A particular method for evaluating LCD pixel drive values 104 to generate flag array 114 is described below with reference to FIG. 3.

Method 100A may be performed for an initial frame of image data in a series of frames. The series of frames may comprise, for example, a scene, or a series of frames having similar or slowly moving or varying content. Upon completion of method 100A, method 100B of FIG. 1B may be performed for subsequent frames of image data in the series.

Figure 1B:
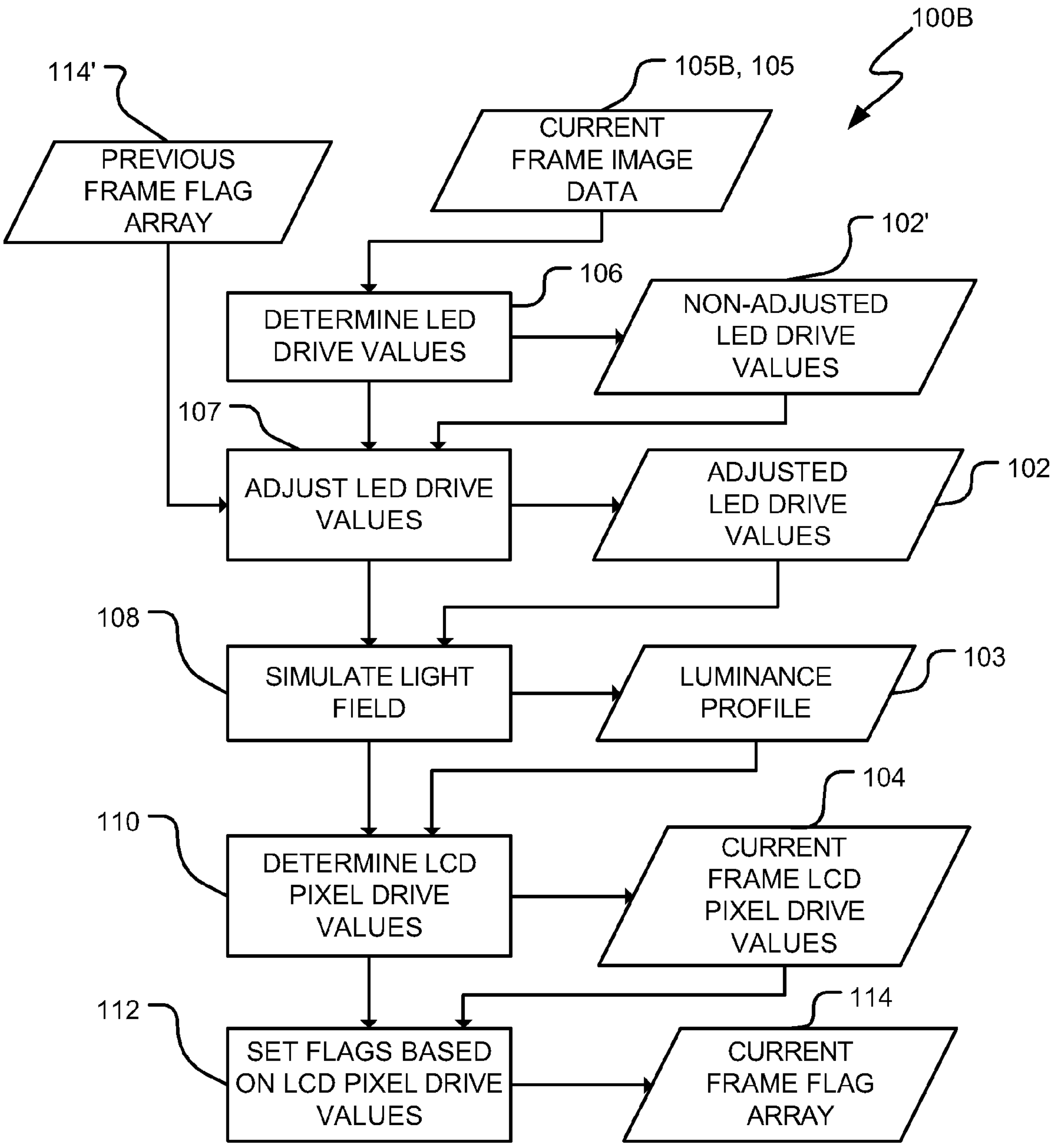
FIG. 1B is a flow chart illustrating a method for generating drive values for subsequent frames of image data according to an example embodiment.

As shown in FIG. 1B, method 100B generates LED drive values 102 and LCD pixel drive values 104 for each frame 105B of image data 105 subsequent to a first frame 105A of image data 105 in a series of frames. Method 100B may be repeated for each frame 105B of image data 105 in the series of frames. Method 100B is similar in many respects to method 100A, and the same reference numerals are used to refer to the similar steps in both methods.

Method 100B begins similarly to method 100A by receiving a current frame 105B of image data 105 to be processed, and determining at block 106 (non-adjusted) LED drive values 102' based on the current frame 105B of image data 105. The block 106 determination of LED drive values 102' in method 100B may be carried out in the same manner as described above with respect to block 106 of method 100A.

Method 100B differs from method 100A in that the LED drive values 102' determined at block 106 may undergo adjustment at block 107. The block 107 adjustment may be based at least in part on a flag array 114' determined for a frame of image data previous to the current frame 105B of image data 105. The flags in flag array 114' are indicative of regions where an adjustment to the backlight control values may be appropriate. For example, the backlight may have been providing too much light (resulting in LCD pixel drive values being “crushed” or reduced to a threshold minimum level) or not enough light (resulting in LCD pixel drive values being “clipped” to a threshold maximum level) for display of the image in the previous frame. According to certain embodiments, if the LCD pixel drive values in a region of the previous frame were higher than a threshold maximum value (e.g. such that the region’s corresponding flag in flag array 114' is set above 1 as in the embodiment described above), then the LED drive values 102' may be adjusted at block 107 by raising one or more of the LED drive values which correspond to the region by a predetermined or calculated amount. If the LCD pixel drive values in a region of the previous frame were lower than a threshold minimum value (e.g. such that the region’s corresponding flag in flag array 114' is set below 1 as in the embodiment described above), then the LED drive values 102' may be adjusted by lowering one or more of the LED drive values which correspond to the region by a predetermined or calculated amount.

Some regions may have an appropriate level of light (e.g. regions for which the corresponding flag in flag array 114' is at its initial value, 1) and therefore the LED drive values 102' corresponding to such region may not be adjusted at block 107. A particular method for adjusting LED drive values 102' that may be applied at block 107 of method 100B is described below with reference to FIG. 2. The block 107 adjustment results in a set of LED drive values 102 which may be applied to the light source modulation layer to display the current frame 105B of image data 105.

After adjustment of LED drive values 102 at block 107, method 100B proceeds by performing the same remaining steps as in method 100A of FIG. 1A. In particular, method 100B proceeds to block 108 by performing a light field simulation to determine an expected luminance profile 103 of light received at the display modulation layer. Method 100B then proceeds by determining LCD pixel drive values 104 at block 110 based on the expected luminance profile 103. Method 100B next proceeds by evaluating LCD pixel drive values 104 for each region of frame 105B to determine whether to flag the image region for adjustment of LED drive values 102. The result of the block 112 determination may be an array 114 of flags for frame 105B. The procedures carried out at blocks 108, 110 and 112 of method 100B may be the same as those carried out at the like-numbered blocks of method 100A.

Method 100B may be repeated for each successive frame of image data in the series. For each successive frame, a new frame flag array 114 may be determined at block 112 (overriding any previous determinations of the frame flag array) which is input as the previous frame flag array 114' at the block 107 adjustment for the next frame of image data. Accordingly, the block 107 adjustment applies the latest adjusted flag values from the previous frame.

In other embodiments, the adjustment applied in block 107 may be cumulative. For example, consider a sequence of five frames. For the first frame method 100A is performed. For the second frame method 100B is performed and a first adjustment is made to the LED driving values. For the third frame, method 100B is performed again. A second adjustment is determined and the first and second adjustments are both applied to the LED driving values. For the fourth frame, method 100B is performed again, a third adjustment is determined and the first, second, and third adjustments are applied to the LED driving values. In the fifth frame, an adjustment which is cumulative of first, second, third, and fourth adjustments may all be made to the LED driving values and so on. In some embodiments, repetition of method 100B for successive frames of image data may conclude upon one or more of the following detected conditions signifying the end of the series of frames:

- a scene change (or end of scene);
- a completely black frame; and
- a large change in content between the current frame and the next frame of image data—for example, average brightness of the frames of image data, or some other characteristic of the image data, may be considered to assess the magnitude of the change.

Once the end of a series of frames has been detected, method 100A of FIG. 1A may be performed for an initial frame of image data in the next series of frames, followed by method 100B of FIG. 1B for subsequent frames of image data in the next series, as discussed above.

In particular embodiments, method 100B of FIG. 1B may be performed for each frame of image data in a series of frames, including the initial frame 105A of image data 105 in the series. For the first iteration of method 100B for the initial frame 105A, the flag array 114' may be initialized with "1"s. As a result, when the block 107 adjustment for the initial frame 105A is performed it does not result in any adjustments to the LED drive values (i.e. non-adjusted LED drive values 102' are the same as the adjusted LED drive values 102). The frame flag array 114 which is determined at block 112 for the initial frame 105A may be used as the previous frame flag array 114' for the next iteration of method 100B for a subsequent frame 105B of image data 105, to guide the block 107 adjustment of LED drive values for frame 105B.

Particularly for video data which has slowly or smoothly varying or moving content, each iteration of method 100B may iteratively improve the backlight control values (e.g. the adjusted LED drive values may reduce visual artifacts in image display, and increase efficiency of the display). For two or more identical frames in succession, the magnitude of the flags or number of flagged regions determined at block 112 may decrease for each iteration of method 100B, which may indicate that the LED drive values are approaching optimal values.

In other embodiments, the methods described above may be iteratively performed for the same frame of image data to iteratively adjust the LED drive values for the frame before outputting the final adjusted LED drive values to the light source modulation layer. For example, upon completion of method 100A of FIG. 1A for an initial frame 105A of image data 105, one or more iterations of method 100C of FIG. 1C may be performed for the same frame of image data (i.e. the initial frame 105A) generating, for each iteration, adjusted LED drive values for such frame of image data. After a predetermined number of iterations of method 100C for the initial frame 105A, or after a threshold level of convergence is detected (e.g. the flag array is populated with "1"s indicating no further adjustments are being made to the LED drive values), the adjusted LED drive values from the final (most recent) iteration may be output to the light source modulation layer. The next frame 105B of image data 105 in the series may be retrieved and iterations of the methods described herein may be performed for frame 105B.

Figure 1C:
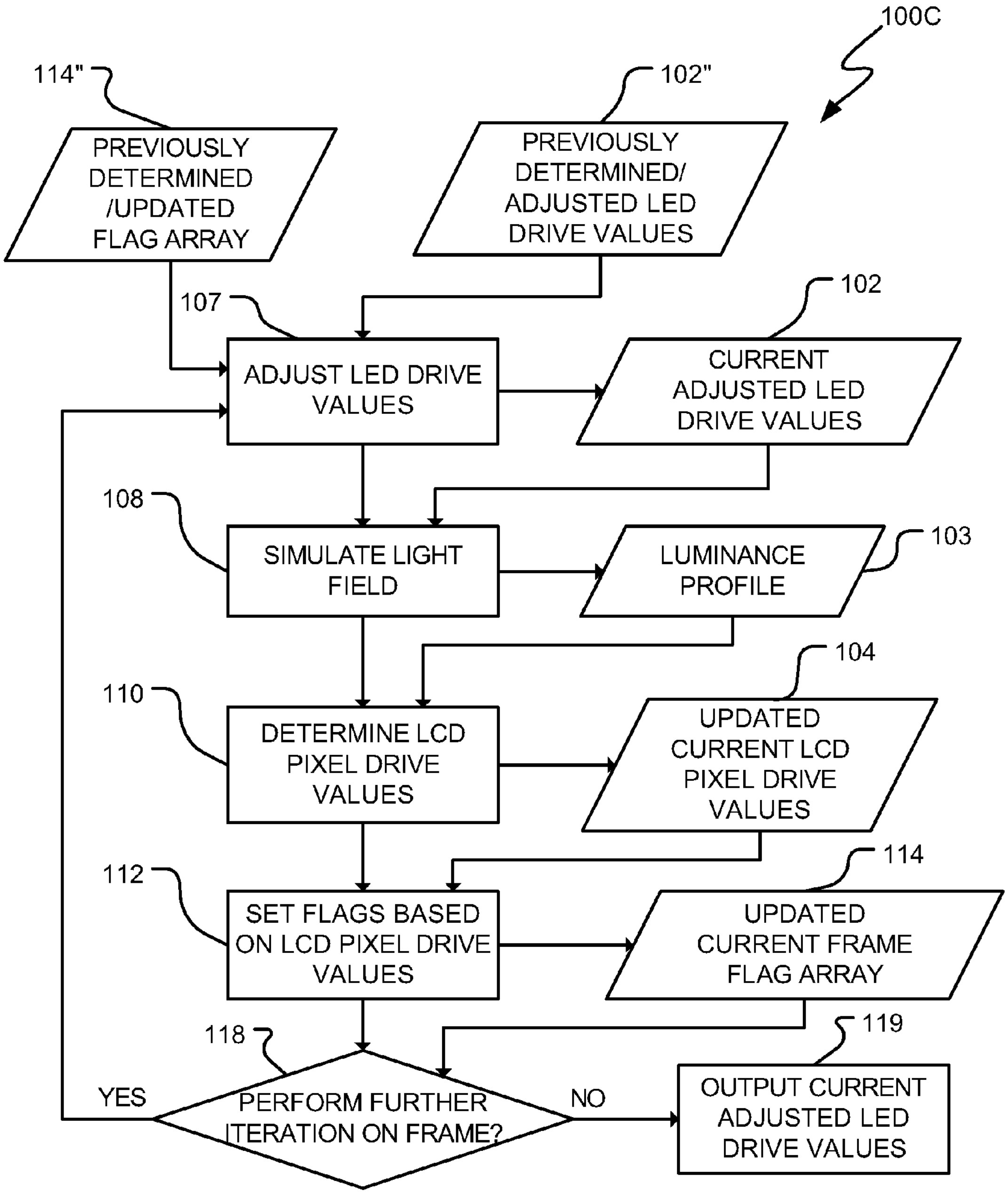
FIG. 1C is a flow chart illustrating a method for generating drive values for a frame of image data according to another example embodiment.

Method 100C of FIG. 1C is similar in some respects to method 100B of FIG. 1B, and the same reference numerals are used to refer to the similar steps in both methods. Method 100C differs from method 100B in that rather than determining LED drive values from the frame of image data, method 100C uses previously determined LED drive values 102" as an input to the block 107 adjustment. For example, for a first iteration of method 100C for an initial frame 105A of image data 105, the previously determined LED drive values 102" may be the (non-adjusted) LED drive values 102 determined by the previous iteration of method 100A on the initial frame 105A of image data 105. For each further iteration of method 100C for the initial frame 105A of image data 105, the previously determined LED drive values 102" may be the adjusted LED drive values 102 determined by the recent most iteration of method 100C.

Method 100C also uses the previously determined flag array 114" as an input to the block 107 adjustment. For a first iteration of method 100C for an initial frame 105A of image data 105, the previously determined flag array 114" may be the flag array 114 determined by the previous iteration of method 100A for the initial frame 105A of image data 105. For each further iteration of method 100C for the initial frame 105A of image data 105, the previously determined flag array 114" may be the flag array 114 as updated by the recent most iteration of method 100C.

After determining adjusted LED drive values at block 107 based on the previously determined flag array 114" and previously determined LED drive values 102", method 100C proceeds similarly to method 100B. In particular, method 100C proceeds to block 108 by performing a light field simulation to determine an expected luminance profile 103 of light received at the display modulation layer. Method 100C then proceeds by determining updated LCD pixel drive values 104 at block 110 based on the expected luminance profile 103. Method 100C next proceeds by evaluating the updated LCD pixel drive values 104 for each region of the frame to determine whether to flag the image region for adjustment of LED drive values 102. The result of the block 112 determination may be an updated array 114 of flags for the frame 105A of image data 105. The procedures carried out at blocks 108, 110 and 112 of method 100C may be the same as those carried out at the like-numbered blocks of method 100B of FIG. 1B (and method 100A of FIG. 1A).

After the block 112 determination, method 100C proceeds to block 118 by assessing whether further iterations should be performed for the frame 105A of image data 105. For example, as noted above, method 100C may be repeated a predetermined number of times for the frame of image data, or, in other embodiments, method 100C may be repeated for the frame of image data until a threshold level of convergence is detected (e.g. the flag array is populated with "1"s indicating no further adjustments are needed to the LED drive values).

If it is determined at block 118 that a further iteration of method 100C is to be performed, then the adjusted LED drive values 102 determined at block 107 of the current iteration are used as the previously determined LED drive values 102" for the next iteration, and the updated frame flag array 114 determined at block 110 of the current iteration is used as the previously determined flag array 114" for the next iteration.

If it is determined at block 118 that no further iterations are to be performed, then method 100C proceeds to block 119 by outputting to the light source modulation layer the adjusted LED drive values 102 as determined at block 107 of the current iteration. The next frame 105B of image data 105 in the series of frames of image data may be retrieved, and the methods described above may be performed for frame 105B.

In particular embodiments, method 100B of FIG. 1B may be initially performed (as a first iteration) for frame 105B (rather than method 100A of FIG. 1A as described above for an initial frame 105A in the series) using updated frame flag array 114 and adjusted LED drive values 102 determined for the previous frame of image data. Upon completion of method 100B of FIG. 1B for frame 105B, one or more iterations of method 100C of FIG. 1C may be performed for frame 105B in order to further adjust the LED drive values for frame 105B.

Figure 2:
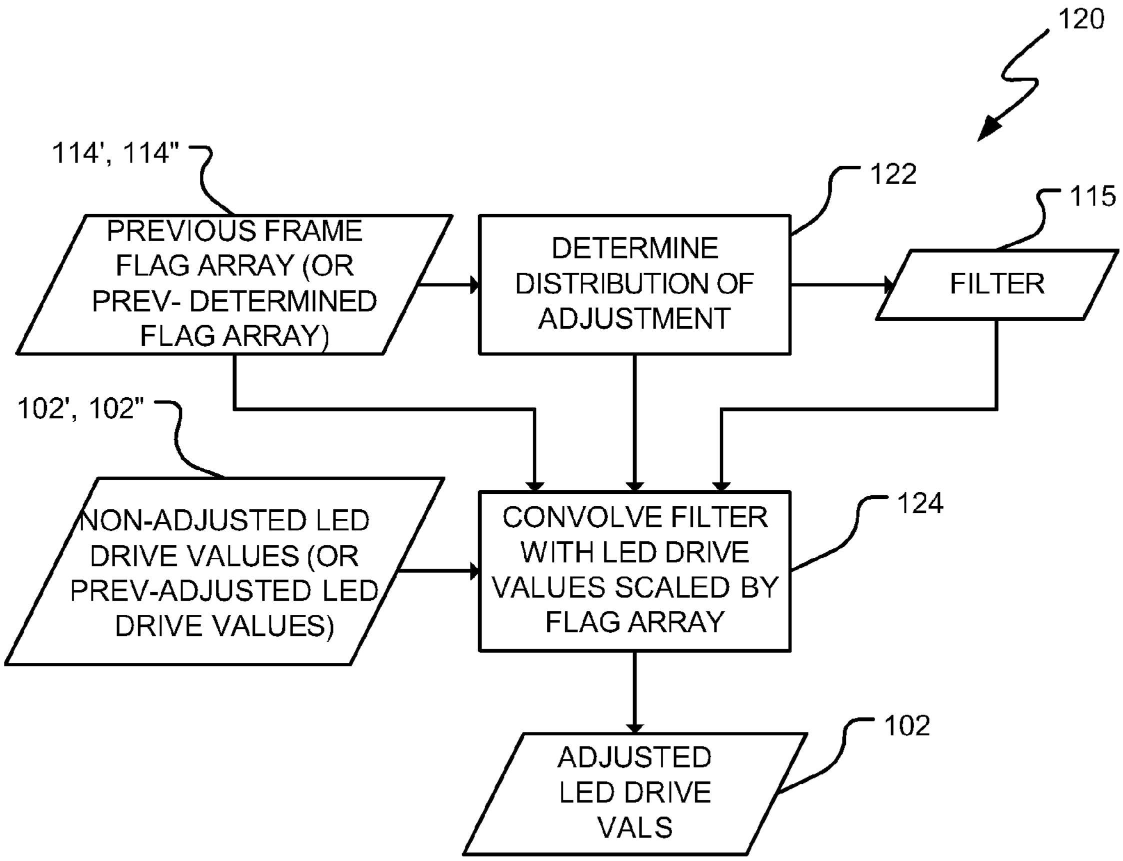
FIG. 2 is a flow chart illustrating a specific implementation of a method according to an example embodiment for adjusting light source modulation layer drive values.

FIG. 2 illustrates a method 120 for adjusting light source modulation layer drive values 102' or 102". Method 120 may be performed at block 107 of method 100B (FIG. 1B) or block 107 of method 100C (FIG. 1C), for example. Method 120 begins at block 122 by selecting or determining a filter kernel 115 which will determine how the adjustment to the backlight drive values is distributed over a local area. In particular embodiments, the filter kernel 115 may have, for example, a cosine or Gaussian distribution and a width corresponding to the proportional area of light distribution from each light source modulation layer element. If no smoothing or distribution is desired, then filter kernel 115 may be a direct-delta function. In particular embodiments, the shape of the filter kernel may be fixed for all frames of image data (i.e. a fixed filter kernel is used) and light source intensities may accordingly be scaled by values in the flag array. In other embodiments, a fixed filter kernel may be scaled by corresponding values in the flag array; the scaled filter kernel is applied to the light source modulation layer drive values. In yet other embodiments, a fixed filter kernel may be applied to light source modulation layer drive values; the filtered drive values may be scaled by corresponding values in the flag array.

The filter kernel 115 may be initialized with an integrated sum of one in some embodiments, or it may be greater than one, or less than one, in other embodiments. The integrated sum may be a constant amount or it may be adjusted based on the magnitude of "clipping" of LCD pixel drive values or the magnitude of raised black levels, as indicated by flag array 114' determined for the previous frame of image data.

Where method 120 is performed at block 107 of method 100B, the (non-adjusted) light source drive values 102' may be provided as a two-dimensional array of backlight drive values stored in memory ("backlight array"). Also, flag array 114' or may be provided as a two-dimensional array stored in memory, having the same size as the backlight array.

In particular embodiments, "virtual" LED drive values may have been determined (e.g. at block 106 of methods 100A and 100B) which are at a different resolution than the actual LEDs. For example, the virtual LED drive values may be represented as a rectangular grid of LED drive values having a higher resolution than the light source modulation layer (e.g. twice the resolution). The use of virtual LED drive values may be advantageous for processing in cases where the actual LEDs are arranged on the light source modulation layer in a non-rectangular grid such as, for example, a hexagonal grid (e.g. in such cases, virtual LEDs may be included between the actual LEDs to represent the light sources as a uniform rectangular grid for easier processing). In such embodiments, the virtual LED drive values may be subsequently downsampled to the resolution of the backlight array in order to determine adjusted LED drive values by way of method 120.

At block 124, a two-dimensional convolution may be performed for each element in the backlight array, such that the backlight array scaled by the corresponding values in flag array 114' is convolved with filter kernel 115.

In particular embodiments, if flag array 114' is populated with "1"s (indicating no adjustments to the light source drive values), then at the block 124 convolution the filter kernel 115 may simply apply a smoothing operation on the light source drive values. If an element in the flag array 114' has a value of greater than 1, then at the block 124 convolution the effect of filter kernel 115 is to increase the drive values of the backlight in the corresponding local region. If an element in the flag array 114' has a value of less than 1, then at the block 124 convolution the effect of filter kernel 115 is to decrease the drive values of the backlight in the corresponding local region.

The block 124 convolution results in adjusted light source drive values 102 which may be applied to drive the light source modulation layer for the current frame of image data.

Method 120 may also be performed at block 107 of method 100C (FIG. 1C). In such case, the backlight array input at block 124 may comprise previously determined light source drive values 102" and the flag array input at blocks 122, 124 may comprise previously determined flag array 114".

Figure 3:
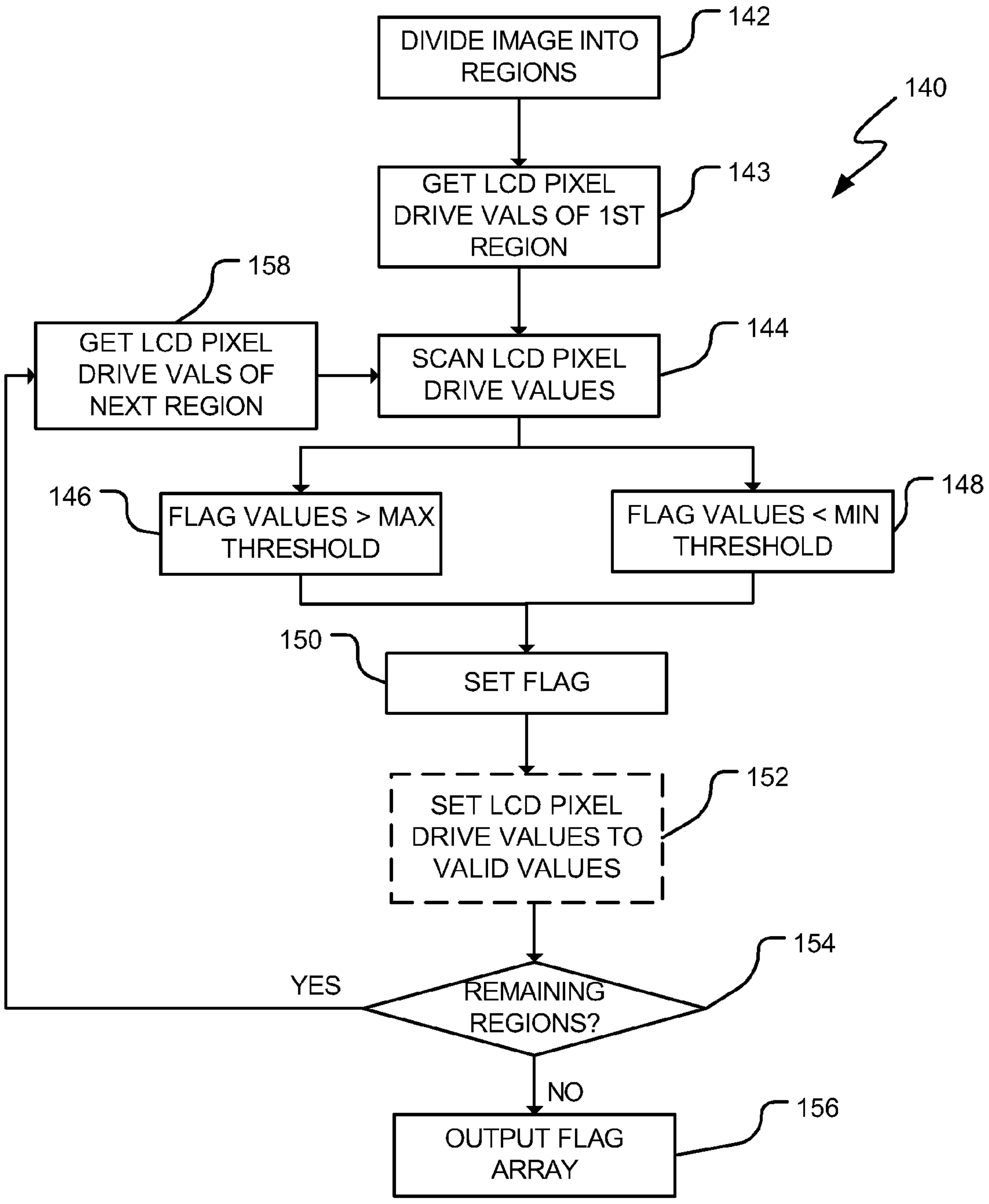
FIG. 3 is a flow chart illustrating a specific implementation of a method according to an example embodiment for flagging image regions for adjustment of light source modulation layer drive values in subsequent frames of image data.

FIG. 3 illustrates a method 140 for flagging image regions for adjustment of light source modulation layer drive values in subsequent frames of image data. Method 140 may be performed at blocks 112 of methods 100A (FIG. 1A) and 100B (FIG. 1B), for example. An initial flag array 114 may be provided which is initialized with "1"s. Method 140 sets the values in flag array 114 to indicate regions which are flagged for adjustment.

Figure 4A:
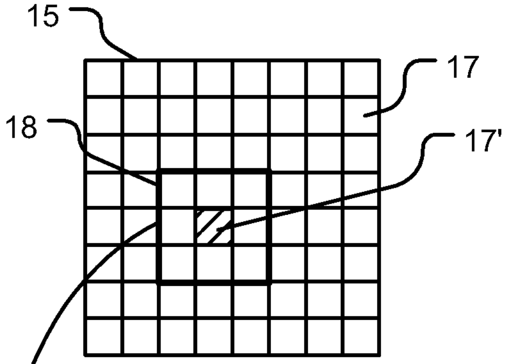
FIG. 4A illustrates a light source modulation layer array.

As seen in FIG. 3, method 140 begins by dividing the image frame into regions at block 142. Each region may correspond to one or more light source modulation layer elements, for example. FIG. 4A shows an array 15 of light source modulation layer elements 17 each of which is associated with a light source drive value. An example region 18 corresponding to one light source modulation layer element 17' is shown in FIG. 4A. Each region 18 may overlap with adjacent regions 18.

Figure 4B:
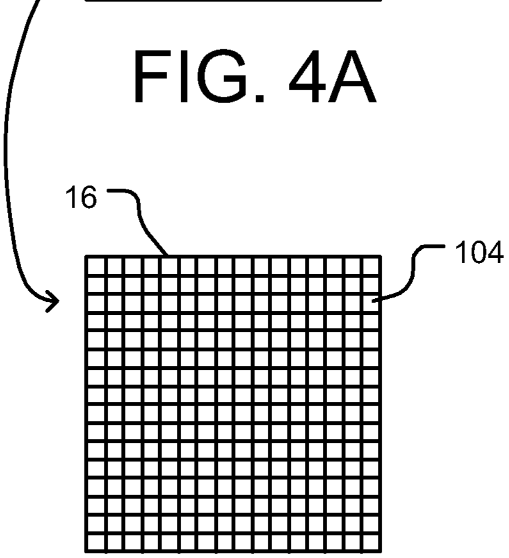
FIG. 4B illustrates pixels in a region of a display modulation layer centered around one element of the light source modulation layer array of FIG. 4A.

Method 140 of FIG. 3 proceeds by retrieving at block 143 the LCD pixel drive values corresponding to the first region. FIG. 4B illustrates an array 16 of LCD pixel drive values 104 corresponding to region 18 shown in FIG. 4A. At block 144 of method 140 (FIG. 3), the LCD pixel drive values in the region are scanned. In the illustrated embodiment, if there are any LCD pixel drive values which are greater than a threshold maximum value then the region may be flagged at block 146. For LCD pixel drive values which are constrained to have values between 0 and 1, the threshold maximum value may be 1, or less than 1 (e.g. 0.9, 0.8, etc.), for example. If there are any LCD pixel drive values which are less than a threshold minimum value then the region may be flagged at block 148. The threshold minimum value may be 0, or above 0 (e.g. 0.1, 0.2, etc.), for example.

At block 150, a flag value is determined for the element in the flag array 114 which corresponds to the region being scanned. The flag value may remain at its initial value of "1" if no LCD pixel drive values were above the threshold maximum value at block 146 or below the threshold minimum value at block 148. However, if any LCD pixel drive values were above the threshold maximum value at block 146 or below the threshold minimum value at block 148 (or, in some embodiments, if more than a threshold number of LCD pixel drive values were above the threshold maximum value at block 146 or below the threshold minimum value at block 148), then the corresponding element in the flag array 114 is set with a new flag value.

In particular embodiments, each flag value in flag array 114 corresponds to one region 18. The LCD pixel drive values for each region 18 may be scanned to determine the region's corresponding flag value. Some methods for determining or setting the flag values are described below.

For each "clipped" LCD pixel in the region (i.e. the LCD pixel drive value is above the threshold maximum value), the flag value may be set to the difference between the LCD pixel drive value and the threshold maximum value, multiplied by a predetermined scalar value, plus 1. If the region contains more than one "clipped" LCD pixel, then the flag value may represent the maximum flag value for the region, or it may represent the average flag value for the region, or some combination or other statistical representation of the flag values. For each "crushed" LCD pixel in the region (i.e. the LCD pixel drive value is below the threshold minimum value), the flag value may be set to the difference between the LCD pixel drive value and the threshold minimum value, multiplied by a predetermined scalar value, plus 1. If the region contains more than one "crushed" LCD pixel, then the flag value may represent the minimum flag value for the region, or it may represent the average flag value for the region, or some combination or other statistical representation of the flag values.

In cases whether there are both "clipped" and "crushed" LCD pixels within the same region (i.e. some LCD pixel drive values are above the threshold maximum value, yet other LCD pixel drive values are below the threshold minimum value) then the flag value may represent the maximum flag value for the region, or it may represent some combination or other statistical representation of the flag values in the region.

In particular other embodiments, the flag value may be set to an LCD pixel drive value representative of the region (e.g. the maximum LCD pixel drive value for the region, average LCD pixel drive value for the region, or some combination or other statistical representation of the LCD pixel drive values). In such embodiments it may not be necessary to compare LCD pixel drive values to threshold maximum or minimum values as described above with reference to blocks 146 and 148 of method 140 (FIG. 3). For a subsequent frame of image data, the LED drive values may be adjusted by multiplying the LED drive values or filter kernel by the flag values. The following table illustrates example values for three different pixels (A, B, C) for two successive frames of image data (where $A_1$, $B_1$, $C_1$ represent pixels in the first frame and $A_2$, $B_2$, $C_2$ respectively represent the same pixels in the second frame):

| Frame | Target | LED | LFS | LCD | Flag |
|---|---|---|---|---|---|
| $A_1$ | 0 | 1 | 0.1 | 0 | 0 |
| $A_2$ | 0 | 0 | 0.05 | 0 | 0 |
| $B_1$ | 0.1 | 2 | 0.2 | 0.5 | 0.5 |
| $B_2$ | 0.1 | 1 | 0.1 | 1 | 1 |
| $C_1$ | 1 | 5 | 0.5 | 2 | 2 |
| $C_2$ | 1 | 10 | 1 | 1 | 1 |

In the above example, "Target" is the target LCD pixel value between 0 and 1 as determined from the image data; "LED" is the LED drive value, as may be computed at block 106 for example (FIGS. 1A, 1B); "LFS" is the light field simulation value between 0 and 1, as may be computed at block 108 for example (FIGS. 1A, 1B); "LCD" is the LCD pixel drive value determined based on the target LCD pixel value and the light field simulation, as may be computed at block 110 for example (FIGS. 1A, 1B); and "Flag" is set to the representative LCD pixel drive value for the region. In certain embodiments, flag values which are zero (e.g. flag values for pixels $A_1$, $A_2$ in the above example) may be adjusted to a predetermined small non-zero value (e.g. 0.1) prior to multiplication with LED drive values.

In other embodiments, the flag value may be set to +1 where the representative LCD pixel drive value is above a threshold value, −1 where the representative LCD pixel drive value is below the threshold value, and 0 where the representative LCD pixel drive value is equal to the threshold value. The threshold value may be 1, for example. For a subsequent frame of image data, the LED drive values may be adjusted by adding the flag values to the LED drive values.

In still other embodiments, the flag value may be set to the representative LCD pixel drive value minus 1. For a subsequent frame of image data, the LED drive values may be adjusted by adding the flag values to the LED drive values.

At block 152 of method 140, any non-valid LCD pixel drive values may be set to valid LCD pixel drive values. For example, if the LCD pixel drive value is above a maximum threshold value (e.g. the LCD pixel drive value>1), then the LCD pixel drive value may be clipped to 1. If the LCD pixel drive value is below a minimum threshold value (e.g. the LCD pixel drive value<0), then the LCD pixel drive value may be clipped to 0.

In certain embodiments, if the LCD pixel drive value is greater than 1, then each of the RGB values may be scaled appropriately so that one of the RGB values is clipped to 1 but the original ratios between the RGB values are maintained.

The block 152 step may not necessarily be performed as part of method 140 but may be performed at some later stage prior to output of the LCD pixel drive values to the display modulation layer.

Method 140 then proceeds to block 154. If at block 154 it is determined that there are remaining image regions to be scanned, the LCD pixel drive values corresponding to the next region are retrieved at block 158. The scanning/flagging steps described above are then repeated for such region, commencing at block 144 (i.e. scanning the LCD pixel drive values corresponding to the region).

Figure 4C:
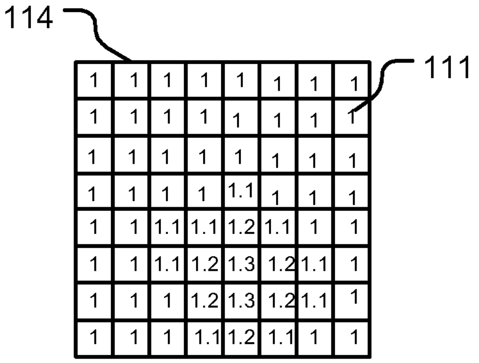
FIG. 4C illustrates an array of flags corresponding to the light source modulation layer array of FIG. 4A.

If there are no remaining image regions to be scanned (block 154), method 140 concludes by outputting the flag array 114 at block 156. FIG. 4C illustrates an example flag array 114 corresponding to the light source modulation layer array 15 of FIG. 4A.

As noted above, the methods described herein may yield improved light source modulation layer drive values particularly for still images or video having slowly or smoothly varying or moving content. For image data having rapidly changing content or large differences between frames, the adjustment methods may result in some distortion in the displayed image. Such distortion may be more noticeable for lower frame rates (e.g. 24 Hz) than for higher frame rates (e.g. 240 Hz). Distortion may be mitigated by adapting the methods for rapidly changing image data. For example, in some embodiments, the light source modulation layer drive values may not be adjusted where one or more conditions are present. Such conditions may include, for example: a detected or indicated scene change, or the number of flagged regions or magnitude of the flag values exceeding a predetermined threshold. Thus, in method 100B of FIG. 1B, for example, the block 107 adjustment may be skipped if one or more such conditions were present. The non-adjusted LED drive values 102' are then applied to drive the light source modulation layer.

Other techniques for adapting to rapidly changing content may involve modifying the width of the filter kernel that is applied to adjust the light source modulation layer values. For example, the particular filter kernel 115 established in method 120 (FIG. 2) for distributing the adjustment of light source modulation layer drive values may be adjusted or selected based on a measure of motion in the image content. For slowly moving or static content, it may be desirable to use a filter kernel having a smaller width in order to increase contrast. However, for rapidly changing content it may be desirable to use a filter kernel having a larger width for increased smoothing of the backlight drive values, thereby decreasing motion artifacts.

According to particular embodiments, one method of measuring the motion is to establish a two-dimensional motion array, wherein each element of the array corresponds to a region of the image. The motion array may be populated with zeros if the content is static, and may be populated with positive values if the content is changing. Higher values may indicate greater motion in the corresponding image regions. The values in the motion array may be determined by calculating the sum of differences in pixel values between two adjacent input images within each region of the image, or by considering motion vectors in the image data, or the like. The motion array may be used to modify or select the desired width of the filter kernel, according to a predetermined algorithm, wherein wider filter kernels are used for more rapidly changing content.

Figure 5:
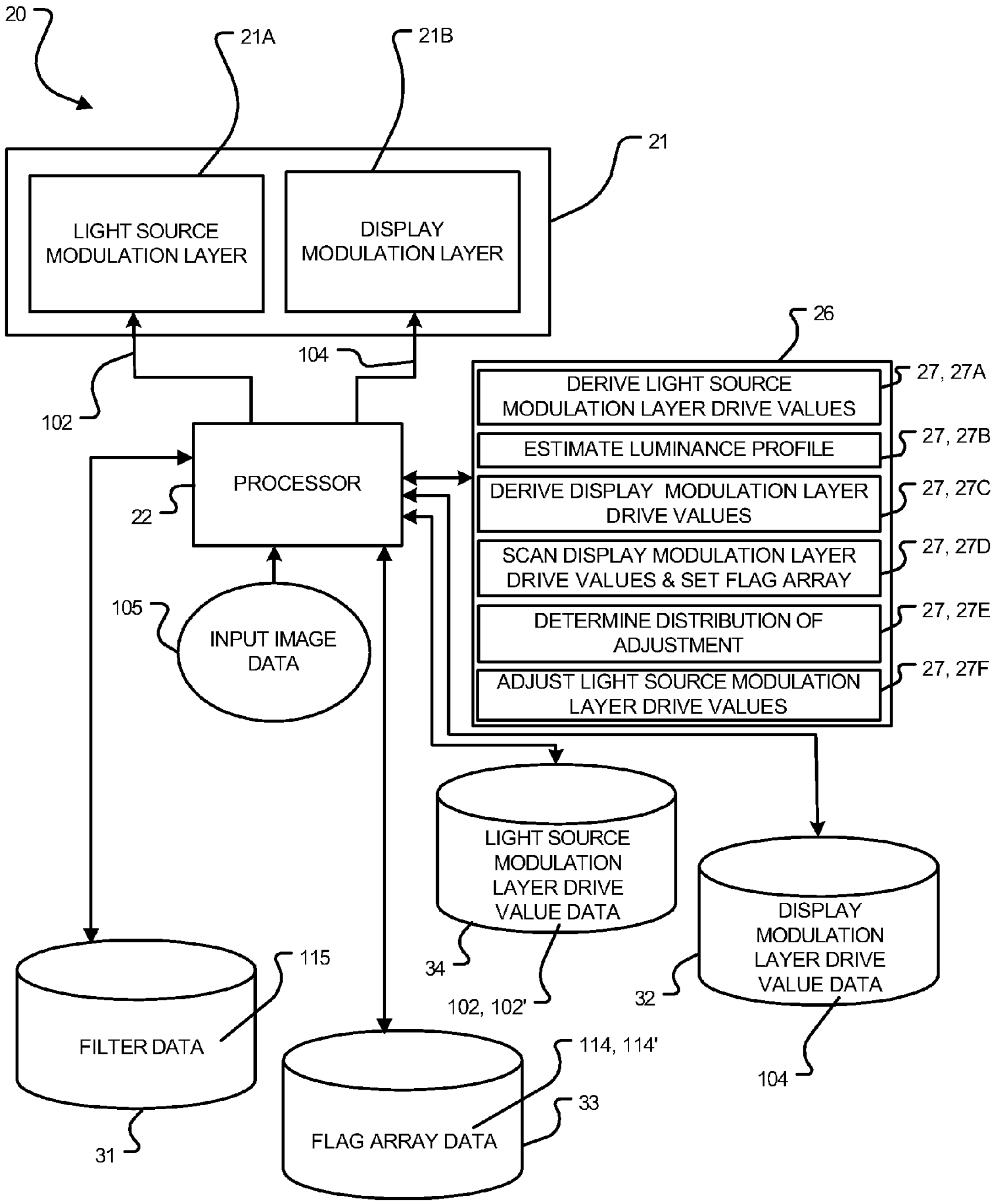
FIG. 5 schematically illustrates apparatus according to an example embodiment which may be used to implement one or more of the methods described herein.

FIG. 5 illustrates display apparatus 20 which may be operated to display image data 105. Apparatus 20 may, for example, comprise a television, a computer display, a special purpose display such as a display in a vehicle simulator, game, virtual reality system, or the like. Apparatus 20 may be configured to perform one or more of the methods described herein, such as methods 100A (FIG. 1A), 100B (FIG. 1B), 100C (FIG. 1C), 120 (FIG. 2) and 140 (FIG. 3). Apparatus 20 comprises a display 21, such as a high brightness and/or HDR display. In the illustrated embodiment, display 21 comprises a dual modulation display having a light source modulation layer 21A and a display modulation layer 21B.

Apparatus 20 also comprises a processor 22, which may comprise a central processing unit (CPU), one or more microprocessors, one or more FPGAs or any other suitable processing unit(s) comprising hardware and/or software capable of functioning as described herein. Processor 22 processes image data 105 to generate light source modulation layer control values 102 to drive the light source modulation layer 21A, and display modulation layer control values 104 to drive the display modulation layer 21B. In particular embodiments, light source modulation layer 21A comprises a matrix of LEDs. In such embodiments, control values 102 provided to light source modulation layer 21A may comprise LED drive values. In particular embodiments, display modulation layer 21B comprises an array of LCD pixels. In such embodiments, control values 104 provided to display modulation layer 21B may comprise corresponding LCD pixel drive values.

Processor 22 may implement the methods of FIGS. 1A, 1B, 1C, 2 and 3 by executing software instructions provided by software functions 27. In the illustrated embodiment, software functions 27 are stored in a program memory 26, but this is not necessary and software functions 27 may be stored in other suitable memory locations within or accessible to processor 22. In some embodiments, one or more of functions 27 or portions of software functions 27 may alternatively be implemented by suitably configured data processing hardware.

In an alternative embodiment one or more logic circuits are configured to perform the methods of FIGS. 1A, 1B, 1C, 2, and/or 3 as image data is supplied to the logic circuits.

In the illustrated embodiment, processor 22 has access to:

filter data (e.g. representations of different filter kernels 115 for distributing the adjustment to the light source modulation layer control values), which may be stored in a suitable data store 31;

flag array data (e.g. previous frame flag array data 114' as well as current frame flag array data 114), which may be stored in a suitable data store 33;

light source modulation layer drive value data (e.g. non-adjusted light source modulation layer control values 102' and adjusted light source modulation layer control values 102 for the current frame, as determined by processor 22), which may be stored in a suitable data store 34; and display modulation layer drive value data (e.g. display modulation layer control values 104 for the current frame), which may be stored in a suitable data store 32.

Processor 22 may retrieve data from such data stores and write data into such data stores as needed, while executing software functions 27.

In the illustrated embodiment, processor 22 calls software functions 27, such as function 27A to derive light source modulation layer control values (e.g. LED drive values), function 27B to estimate the luminance on display modulation layer 21B, function 27C to derive display modulation layer control values (e.g. LCD pixel drive values), function 27D to scan the display modulation layer control values and determine whether regions should be flagged for adjustment, function 27E to determine how the adjustment to light source modulation layer control values should be distributed, and function 27F to adjust the light source modulation layer control values for driving light source modulation layer 21A.

Aspects of the invention may also be provided in the form of a program product. The program product may comprise any non-transitory medium which carries a set of computer-readable information comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable information on the program product may optionally be compressed or encrypted.

Where a component (e.g. a device, processor, LED, LCD, light source modulation layer, display modulation layer, display, memory, data store, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments.

As will be apparent to those skilled in the art in the light of the foregoing disclosure, many alterations and modifications are possible in the practice of this invention without departing from the spirit or scope thereof. For example:

In some embodiments, LED drive values are determined for a first frame of image data and adjusted according to the methods described herein. Rather than determining new LED drive values for a subsequent frame of image data, the adjusted LED drive values from the previous frame may be used and a correction may be applied to such LED drive values based on the adjustments made in the previous frame(s).

Accordingly, the scope of the invention is to be construed in accordance with the substance defined by the following claims.

What is claimed is:

1. A method for generating drive values for a display comprising a light source modulation layer and a display modulation layer, the method comprising:
- receiving a frame of image data;
- determining a first set of light source modulation layer drive values based at least in part on the frame of image data;
- determining an expected luminance profile at the display modulation layer, based at least in part on the first set of light source modulation layer drive values;
- determining display modulation layer drive values, based at least in part on the expected luminance profile;
- comparing the display modulation layer drive values to a predetermined threshold maximum value and a predetermined threshold minimum value,
- flagging image regions for which any of the display modulation layer drive values are above the predetermined threshold maximum value or below the predetermined threshold minimum value;
- based on the flagged image regions, adjusting a second set of light source modulation layer drive values determined for portions of a subsequent frame of image data that correspond to the flagged image regions,
- wherein flagging the image regions comprises:
  - for each region, setting a corresponding value in a flag array based at least in part on differences between each of the display modulation layer drive values and the predetermined threshold maximum value or the predetermined threshold minimum value,
- wherein adjusting the second set of light source modulation layer drive values comprises:
  - determining a filter kernel for distributing adjustments to the second set of light source modulation layer drive values, and
  - convolving the filter kernel with the light source modulation layer drive values scaled by corresponding values in the flag array; and
- determining a measure of motion of the image data and adjusting a width of the filter kernel based at least in part on the measure of motion.

2. A method for adjusting light source modulation layer drive values for driving a display to display a current frame of image data, the method comprising:
- receiving a set of display modulation layer drive values determined for a previous frame of image data;
- scanning the set of display modulation layer drive values for values that are above a predetermined threshold maximum value and below a predetermined threshold minimum value;
- flagging image regions for which any of the display modulation layer drive values are above the predetermined threshold maximum value or below the predetermined threshold minimum value;
- based on the flagged image regions, adjusting the light source modulation layer drive values for portions of the current frame of image data,
- wherein flagging the image regions comprises:
  - for each region, setting a corresponding value in a flag array based at least in part on differences between each of the display modulation layer drive values and the predetermined threshold maximum value or the predetermined threshold minimum value;
- determining a filter kernel for distributing adjustments to the light source modulation layer drive values; and
- determining a measure of motion of the image data and adjusting a width of the filter kernel based at least in part on the measure of motion.

3. The method according to claim 2, wherein adjusting the light source modulation layer drive values comprises:
- convolving the filter kernel with the light source modulation layer drive values scaled by corresponding values in the flag array.

4. Display apparatus comprising:
- a display comprising a light source modulation layer and a display modulation layer, the display operable to display image data; and
- a processor operable to provide control signals to the display based on the image data, wherein the processor is configured to:
  - determine light source modulation layer drive values based at least in part on the image data,
  - determine an expected luminance profile at the display modulation layer, based at least in part on the light source modulation layer drive values,
  - determine display modulation layer drive values, based at least in part on the expected luminance profile, scan the display modulation layer drive values for values that are above a predetermined threshold maximum value and below a predetermined threshold minimum value, flag image regions for which any of the display modulation layer drive values are above the predetermined threshold maximum value or below the predetermined threshold minimum value, adjust the light source modulation layer drive values for portions of a current frame of image data that correspond to the flagged image regions of a previous frame of image data, determine a filter kernel for distributing adjustments to the light source modulation layer drive values, and determining a measure of motion of the image data and adjusting a width of the filter kernel based at least in part on the measure of motion.

5. The display apparatus according to claim 4, wherein the processor is configured to, for each image region, set a corresponding value in a flag array based at least in part on differences between each of the display modulation layer drive values and the predetermined threshold maximum value or the predetermined threshold minimum value.

6. The display apparatus according to claim 5, wherein the processor is configured to convolve the filter kernel with the light source modulation layer drive values scaled by corresponding values in the flag array.

7. A method for generating drive values for a display comprising a light source modulation layer and a display modulation layer, the method comprising:

receiving a frame of image data, determining a first set of light source modulation layer drive values based at least in part on the frame of image data, determining an expected luminance profile at the display modulation layer, based at least in part on the first set of light source modulation layer drive values, determining display modulation layer drive values, based at least in part on the expected luminance profile, scanning the display modulation layer drive values to determine a flag value for each corresponding image region, wherein the flag value is representative of the display modulation layer drive values for the corresponding image region, and based on the flag values, adjusting a second set of light source modulation layer drive values determined for portions of a subsequent frame of image data that correspond to the flagged image regions, wherein adjusting the second set of light source modulation layer drive values comprises determining a filter kernel for distributing adjustments to the second set of light source modulation layer drive values, and a width of the filter kernel is determined based on determining a measure of motion from the image data.

8. The method according to claim 7, wherein the flag value for each corresponding image region is determined based on a maximum display modulation layer drive value for the image region, average display modulation layer drive value for the image region, or some combination or other statistical representation of the display modulation layer drive values for the image region.

9. A method for generating drive values for a display comprising a light source modulation layer and a display modulation layer, the method comprising:

receiving a frame of image data, determining light source modulation layer drive values based at least in part on the frame of image data, determining an expected luminance profile at the display modulation layer, based at least in part on the light source modulation layer drive values, determining display modulation layer drive values, based at least in part on the expected luminance profile, comparing the display modulation layer drive values to a predetermined threshold maximum value and a predetermined threshold minimum value, flagging image regions for which any of the display modulation layer drive values are above the predetermined threshold maximum value or below the predetermined threshold minimum value, and based on the flagged image regions, adjusting the light source modulation layer drive values for portions of the frame of image data, wherein flagging the image regions comprises:

for each region, setting a corresponding value in a flag array based at least in part on differences between each of the display modulation layer drive values and the predetermined threshold maximum value or the predetermined threshold minimum value, wherein adjusting the light source modulation layer drive values comprises determining a filter kernel for distributing adjustments to the light source modulation layer drive values, and a width of the filter kernel is determined based on determining a measure of motion from the image data.

10. A method for generating drive values for a display comprising a light source modulation layer and a display modulation layer, the method comprising:

receiving a frame of image data;

determining a first set of light source modulation layer drive values based at least in part on the frame of image data;

determining an expected luminance profile at the display modulation layer, based at least in part on the first set of light source modulation layer drive values;

determining display modulation layer drive values, based at least in part on the expected luminance profile;

comparing the display modulation layer drive values to a predetermined threshold maximum value and a predetermined threshold minimum value;

flagging image regions for which any of the display modulation layer drive values are above the predetermined threshold maximum value or below the predetermined threshold minimum value; and based on the flagged image regions, adjusting a second set of light source modulation layer drive values determined for a subsequent frame of image data, wherein adjusting the second set of light source modulation layer drive values comprises determining a filter kernel for distributing adjustments to the second set of light source modulation layer drive values, and a width of the filter kernel is determined based on determining a measure of motion from the image data.

11. The method according to claim 10, wherein flagging the image regions comprises:

for each region, setting a corresponding value in a flag array based at least in part on differences between each of the display modulation layer drive values and the predetermined threshold maximum value or the predetermined threshold minimum value.

12. The method according to claim 11, further comprising convolving the filter kernel with the light source modulation layer drive values scaled by corresponding values in the flag array.

13. The method according to claim 11, wherein the filter kernel is determined based at least in part on values in the flag array.

* * * * *